(12) United States Patent
Ebner et al.

(10) Patent No.: US 10,428,651 B2
(45) Date of Patent: Oct. 1, 2019

(54) CUTTING APPARATUS USING A CLEARING ARRANGEMENT

(71) Applicant: SANDVIK INTELECTUAL PROPERTY AB, Sandviken (SE)

(72) Inventors: Bernhard Ebner, Knittelfeld (AT); Erich Brandl, Grosslobming (AT)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 15/516,645

(22) PCT Filed: Oct. 2, 2015

(86) PCT No.: PCT/EP2015/072851
§ 371 (c)(1),
(2) Date: Apr. 3, 2017

(87) PCT Pub. No.: WO2016/055383
PCT Pub. Date: Apr. 14, 2016

(65) Prior Publication Data
US 2018/0223662 A1 Aug. 9, 2018

(30) Foreign Application Priority Data
Oct. 6, 2014 (WO) ................ PCT/EP2014/071334

(51) Int. Cl.
*E21C 35/20* (2006.01)
*E21D 9/12* (2006.01)
(Continued)

(52) U.S. Cl.
CPC .............. *E21C 35/06* (2013.01); *E21C 25/06* (2013.01); *E21C 25/18* (2013.01); *E21C 27/24* (2013.01);
(Continued)

(58) Field of Classification Search
CPC ..... E21D 9/1013; E21D 9/102; E21D 9/1026; E21D 9/1033; E21D 9/126; E21D 9/128; E21C 35/20; E21C 27/24
See application file for complete search history.

(56) References Cited

U.S. PATENT DOCUMENTS 3,870,369 A * 3/1975 Lobbe ................... E21D 9/1026
299/67
4,380,354 A * 4/1983 LeBegue ................. E21C 35/20
299/18
(Continued)

FOREIGN PATENT DOCUMENTS

CN 203499689 U 3/2014
CN 104594910 A 5/2015
(Continued)

OTHER PUBLICATIONS

English language machine translation of Eckhard, DE-3626986-A1, published Mar. 10, 1988 (7 pages).*

*Primary Examiner* — Janine M Kreck
*Assistant Examiner* — Michael A Goodwin
(74) *Attorney, Agent, or Firm* — Corinne R. Gorski

(57) ABSTRACT

A cutting unit for use with a cutting apparatus suitable for creating tunnels or subterranean roadways and the like, includes a cutting arm configured for pivotal movement around at least one pivot axis and a cutting head mounted to the cutting arm. The cutting head includes at least one rotatable cutting element for detaching material from a rock face, and a clearing arrangement mounted to the cutting arm. The clearing arrangement has a clearing blade for pushing detached rock material onto a loading table of the cutting apparatus, the clearing blade being guided by a first guiding mechanism to allow a free movement of the clearing blade in a first direction.

14 Claims, 11 Drawing Sheets

(51) Int. Cl.
- *E21D 9/10* (2006.01)
- *E21C 35/06* (2006.01)
- *E21C 27/24* (2006.01)
- *E21C 25/18* (2006.01)
- *E21C 29/22* (2006.01)
- *E21D 20/00* (2006.01)
- *E21C 25/06* (2006.01)
- *E21C 35/08* (2006.01)
- *F16H 57/023* (2012.01)
- *F15B 11/16* (2006.01)

(52) U.S. Cl.
CPC .............. *E21C 29/22* (2013.01); *E21C 35/08* (2013.01); *E21C 35/20* (2013.01); *E21D 9/1013* (2013.01); *E21D 9/1026* (2013.01); *E21D 9/1033* (2013.01); *E21D 9/1093* (2013.01); *E21D 9/126* (2013.01); *E21D 20/003* (2013.01); *F15B 11/16* (2013.01); *F16H 57/023* (2013.01); *F16H 2057/0235* (2013.01)

(56) References Cited

U.S. PATENT DOCUMENTS

| | | | | |
|---|---|---|---|---|
| 4,669,785 A | * | 6/1987 | Brandl | E21D 9/124 299/64 |
| 2003/0230925 A1 | | 12/2003 | Oishi | |
| 2016/0265355 A1 | * | 9/2016 | Liu | E21C 27/00 |

FOREIGN PATENT DOCUMENTS

| | | | |
|---|---|---|---|
| CN | 104727817 A | 6/2015 | |
| DE | 3626986 A1 * | 3/1988 | ............ E21C 27/28 |
| DE | 202011050143 U1 | 10/2012 | |
| GB | 1165270 A | 9/1969 | |
| GB | 1173243 A | 12/1969 | |
| GB | 2124407 A | 2/1984 | |
| GB | 2153876 A | 8/1985 | |
| WO | 2010050872 A1 | 5/2010 | |
| WO | 2011093777 A1 | 8/2011 | |
| WO | 2012156841 A2 | 11/2012 | |
| WO | 2012156842 A2 | 11/2012 | |
| WO | 2012156884 A2 | 11/2012 | |
| WO | 2014090589 A2 | 6/2014 | |
| WO | 2015058465 A1 | 4/2015 | |

* cited by examiner

CUTTING APPARATUS USING A CLEARING ARRANGEMENT

RELATED APPLICATION DATA

This application is a § 371 National Stage Application of PCT International Application No. PCT/EP2015/072851 filed Oct. 2, 2015 claiming priority of EP Application No. PCT/EP2014/071334, filed Oct. 6, 2014.

FIELD OF INVENTION

The present invention relates to a cutting unit for use with a cutting apparatus suitable for creating tunnels or subterranean roadways and the like.

Furthermore, the present invention relates to rock cutting apparatus suitable for creating tunnels or subterranean roadways and in particular, although not exclusively, to undercutting apparatus in which a plurality of rotating heads are capable of being slewed laterally outward and raised in the upward and downward direction during forward cutting.

BACKGROUND ART

A variety of different types of excavation machines have been developed for cutting drifts, tunnels, subterranean roadways and the like in which a rotatable head is mounted on an arm that is in turn movably mounted at a main frame so as to create a desired tunnel cross sectional profile. WO2012/156841, WO 2012/156842, WO 2010/050872, WO 2012/156884, WO2011/093777, DE 20 2011 050 143U1. All described apparatus for mill cutting of rock and minerals in which a rotating cutting head forced into contact with the rock face as supported by a movable arm. In particular, WO 2012/156884 describes the cutting end of the machine in which the rotatable heads are capable of being raised and lowered vertically and deflecting in the lateral sideways direction by a small angle in an attempt to try enhance the cutting action.

WO 2014/090589 describes a machine for digging roadways tunnels and the like in which a plurality of cutting heads are movable to dig into the rock face via a pivoting arcuate cutting path. US 2003/0230925 describes a rock excavator having a cutter head mounting a plurality of annular disc cutters suitable to operate in an undercutting mode.

Furthermore, it has been observed that conventional cutting machines are not optimised to cut hard rock having a strength typically beyond 120 MPa whilst creating a tunnel or subterranean cavity safely and reliably of desired cross sectional configuration. Accordingly, what is required is a cutting machine that addresses these problems.

It has been observed that clearing the floor of the tunnel from detached rock material requires a considerable amount of time and can lead to a delay in the tunnel generating process. Further, the floor clearing operation needs to be carried out carefully and thoroughly, since the floor of the tunnel is used by various other parts of the cutting apparatus for support purposes.

Known cutting units for the use with a cutting apparatus suitable for creating tunnels or subterranean roadway comprise a cutting arm configured for pivotal movement around at least one pivot axis and a cutting head mounted to the cutting arm. The cutting head comprises a rotatable cutting element for detaching material from the rock face.

The detached material accumulates on the floor of the tunnel and needs to be removed before the cutting apparatus can move forward in order to proceed with detaching material from the rock face.

From GB 2 153 876 A a clearing arrangement is known, which is mounted to the cutting arm. The clearing arrangement comprises a clearing blade for pushing detached rock material in the direction of a transfer conveyor for transferring the detached material away from the working area.

However, the front edge of the clearing blades of the known cutting units are spaced from the front edge of the cutting head in order to prevent that the clearing blade interferes with an obstacle in the rock face such as protruding rock material not yet being detached by means of the cutting element.

Due to the distance that known clearing blades have with respect to the rock face and to the front edge of the cutting head, such clearing blades cannot be used for scraping loose material from the rock face after material has been detached by means of the cutting elements of the cutting head. Further, the distance between the front edge of the clearing blade and the rock face leads to the fact that only a small amount of the detached and accumulated rock material on the floor of the tunnel is pushed in direction of the transport conveyor resulting in a time consuming and effortful clearing operation.

SUMMARY OF THE INVENTION

It is an objective of the present invention to provide a cutting apparatus and a cutting unit allowing for a quicker and more effective transport of detached rock material away from the floor of the tunnel.

It is a further objective of the present invention to provide a cutting machine suitable to form tunnels and subterranean roadways being specifically configured to cut hard rock beyond 120 MPa in a controlled and reliable manner. It is a further specific objective to provide a cutting machine capable of creating a tunnel with a variable cross sectional area within a maximum and a minimum cutting range. It is a further specific objective to provide a cutting (excavator) machine operable in an 'undercutting' mode according to a two stage cutting action.

The objective is achieved by providing a cutting unit for use with a cutting apparatus suitable for creating tunnels or subterranean roadways and the like, wherein the cutting unit comprises a cutting arm configured for pivotal movement around at least one pivot axis and a cutting head mounted to the cutting arm. The cutting head comprises at least one rotatable cutting element for detaching material from a rock face. The cutting unit according to the invention also comprises a clearing arrangement mounted to the cutting arm, wherein the clearing arrangement comprises a clearing blade for pushing detached rock material onto a loading table of the cutting apparatus. The clearing blade is guided by a first guiding mechanism allowing for a free movement of the clearing blade in a first direction.

Due to the fact that the clearing blade is guided by a first guiding mechanism allowing for a free movement of the clearing blade in a first direction, the interference of the front edge of the clearing with an obstacle, such as a protruding rock material, is prevented. In case the clearing blade gets in contact with an obstacle the first guiding mechanism allows for a movement of the clearing blade away from the obstacle and thereby prevents a mechanical damage of the clearing arrangement. Since the clearing blade is freely moveable in a first direction preventing interference with protruding rock material, the clearing blade can be arranged such that the front edge of the clearing blade is in close proximity to the rock face. This allows for scraping the rock face and for pushing the majority of accumulated detached rock material onto the loading table of the cutting apparatus with a single pushing action of the clearing blade.

Preferably, the first guiding mechanism comprises one or more slide shoes allowing for a free linear movement of the clearing blade in the first direction. By using slide shoes to guide the clearing blade of the clearing arrangement the front edge of the clearing blade can follow the shape of the tunnel's roof during pivotal movement of the cutting arm and the cutting head. The slide shoes prevent the clearing blade from hooking into grooves or protrusions in the rock face created during the cutting process.

Optionally, the clearing arrangement comprises a guiding plate and the first guiding mechanism allows for a relative movement between the clearing blade and the guiding plate. It is preferred that the first direction in which the clearing blade is freely movable, is basically in radial direction with respect to the pivot axis of the cutting arm. The first direction may also deviate up to 20 degrees, preferably 10 degrees, from this radial direction.

Preferably, the clearing blade is guided by a second guiding mechanism allowing for a free movement of the clearing blade in a second direction. Optionally, the second guiding mechanism comprises a pivot bearing allowing for a free rotational movement of the clearing blade in the second direction. In a preferred embodiment, the cutting unit further comprises a locking mechanism for locking the clearing blade in a desired rotational orientation. Due to the possibility to lock the clearing blade of the cutting unit the orientation of the clearing blade can be adapted to the cutting head configuration or to the position and/or configuration of the loading table of the cutting apparatus, on which the detached rock material is pushed by the clearing blade.

Preferably, the clearing arrangement of the cutting unit according to the invention comprises a blade actuator mechanism connecting the clearing blade and the cutting arm. The blade actuator mechanism is configured for moving the clearing blade between a parking position and an operating position. The parking position is to be considered as a retracted position, wherein the distance between the rock face and the front edge of the clearing blade is maximized, wherein the distance between the front edge of the clearing blade and the rock face is minimized in the operating position.

It is preferred that the clearing blade is in the parking position and therefore retracted from the rock face during the cutting process. Generally, the cutting process and thereby the process of detaching rock material is performed while the cutting arm and the cutting head are pivotally moved in an upward direction from the bottom of the tunnel to the top of the tunnel. Since the clearing blade is in the retracted parking position during the cutting process the detached rock material can fall through to the floor of the tunnel.

It is further preferred that the clearing blade is moved from the parking position into the operating position when the cutting arm and the cutting head are in their highest position, such that the front edge of the clearing blade follows the shape of the tunnel profile while the cutting arm and the cutting head are pivotally moved in a downward direction. By following the shape of the tunnel profile loose rock material that remained on the rock face is detached by the clearing blade. In case of obstructing protruding rock material that cannot be detached by means of the clearing blade, the first guiding mechanism allows for a free backward movement of the clearing blade preventing damage of the clearing arrangement.

During the downward pivotal movement of the cutting arm and the cutting head, the detached rock material accumulated on the floor of the tunnel is pushed onto a loading table of the cutting apparatus by means of the clearing blade. Since the clearing blade is in the operating position during downward movement of the cutting arm and the cutting head, the majority of rock material accumulated on the floor of the tunnel has been pushed onto the loading table after the downward pivotal movement of the cutting arm and the cutting head is completed.

Preferably, the blade actuator mechanism is configured such that a movement of the clearing blade between the parking position and the operating position comprises a linear movement and a rotational movement of the clearing blade. It is further preferred that the clearing blade is rotated by an angle in the range of 5 to 20 degrees during the movement between the parking position and the operating position. The movement on the clearing blade between the parking position and the operating position is dominated by the linear movement. Thereby, a space-saving configuration for the movement of the clearing blade between the parking position and the operating position is provided.

In another preferred embodiment of the cutting unit according to the invention the blade actuator mechanism comprises at least one, preferably two pairs of levers. Each pair of levers comprises a first lever and a second lever, wherein first ends of the first and second levers are rotatably mounted to a mounting plate mounted to the cutting arm. Further, opposite seconds ends of the first and second levers are rotatably mounted to a supporting structure of the clearing blade. It is preferred, that the supporting structure of the clearing blade is mounted to the guiding plate, such that the guiding plate connects the supporting structure with the clearing blade.

In another preferred embodiment of the cutting unit according to the invention the first lever has a first length and the second lever has a second length different from the first length. By using first and second levers with different lengths a movement of the clearing blade between the parking position and the operating position being partly linear and partly rotational is obtained. It is preferred that first and second levers are basically parallel to each other when the clearing blade is in the parking position. However, is shall be understood that "basically parallel" allows for deviations from the parallel arrangement up to 10 degrees. It is further preferred, that the first and second levers are not parallel (or less parallel) to each other in the operating position.

In an advantageous embodiment of the cutting unit according to the invention, the first and second levers each comprise a stop surface. The stop surfaces of the first and second levers touch each other and limit the movement of the clearing blade, when the clearing blade is in the operating position. It is preferred that the stop surfaces are formed by notches within the surface of the first and second levers.

Preferably, the blade actuator mechanism comprises a hydraulic cylinder configured for moving the clearing blade between the parking position and the operating position. The first end of the hydraulic cylinder is preferably rotatably mounted to the cutting arm. The second opposite end of the hydraulic cylinder is preferably rotatably mounted to an intermediate lever, wherein the intermediate lever is rotatably mounted to the supporting structure of the clearing arrangement. It is further preferred, that the intermediate lever is rotatably mounted to the supporting structure such that the mount allows for a rotational movement about an axis, about which also one of the first and second levers is rotatable.

Optionally, the clearing blade comprises a curved front edge, wherein the front edge is directed to the rock face when in use. Since the cutting head and its rotatable cutting elements are often configured in a circular arrangement, the generated rock face resulting from the cutting process is curved due to the pivotal movement of the cutting arm and the cutting head around the pivot axis. By providing a clearing blade with a curved front edge, the front edge can follow the shape of the tunnel profile, such that loose material is detached by the clearing blade over its entire width.

In another advantageous embodiment of the cutting unit according to the invention at least one, preferably two or three claws are mounted to the clearing blade. Optionally, the claws are flush-mounted to the front edge of the clearing blade or extent beyond the front edge of the clearing blade. The claws are used to scrape loose material from the rock face or to establish a constant distance between the front edge of the clearing blade and the rock face.

The objective is also achieved by a cutting apparatus suitable for creating tunnels and subterranean roadways and the like, wherein the cutting apparatus comprises a loading table for receiving detached rock material and a cutting unit. The cutting unit of the cutting apparatus is configured according to one of the above described embodiments, wherein the clearing blade of the cutting unit is configured for pushing and detached rock material onto the loading table.

Regarding the advantages of the cutting apparatus according to the invention it is referred to the advantages of the cutting unit according to the invention.

In a preferred embodiment of the cutting apparatus according to the invention the loading table and the cutting unit are mounted on a common frame, wherein the common frame is configured for relative movement with respect to a main frame of the apparatus, to which a drive unit for movement of the apparatus is mounted. Further, it is preferred that a transport conveyor for transporting the detached rock material is mounted on the common frame. Thereby a constant distance between the loading table, the transport conveyor and the clearing blade is obtained. Due to this constant distance, it is no longer necessary to perform any re-adjustments of the clearing blade or the loading table in order to maintain a high loading efficiency.

The further objectives are achieved by providing a cutting apparatus having a plurality of rotatably mounted cutting heads that may be pivoted in an upward and downward direction and a lateral side-to-side direction via a plurality of independently pivoting booms mounted at a main frame. In particular, each boom comprises a support pivotally mounted to the main frame and carrying an arm via a respective additional pivot mounting such that each cutting head is capable of pivoting about two pivoting axes. The desired range of movement of each head is provided as the dual pivoting axes are aligned transverse (including perpendicular) to one another and are spaced apart in the longitudinal direction of the apparatus between a forward and rearward end.

Advantageously, the cutting heads comprise a plurality of disc-like roller cutters distributed circumferentially around a perimeter of each head so as to create a groove or channel into the rock face as the heads are driven about their respective rotational axes. The heads may then be raised vertically so as to overcome the relatively low tensile strength of the overhanging rock to provide breakage via force and energy that is appreciably lower than a more common compressive cutting action provided by cutting picks and the like.

According to a further aspect of the present invention there is provided cutting apparatus suitable for creating tunnels or subterranean roadways and the like comprising: a main frame having generally upward, downward and side facing regions; a first and second support pivotally mounted relative to the main frame via respective first and second support axes aligned generally upright relative to the upward and downward facing regions such that each first and second support is configured to pivot laterally in a sideways direction relative to the side facing regions; at least one first and second support actuator to respectively actuate independently movement of each of the first and second supports relative to the main frame; a first and second arm each pivotally mounted to the respective first and second support via a respective arm pivot axis aligned in a direction extending transverse including perpendicular to each support pivot axis to enable the first and second arms to pivot independently of one another and to pivot relative to each of the respective first and second supports in an upward and downward direction relative to the upward and downward facing regions; at least one first and second arm actuator to actuate independently pivoting movement of the first and second arms relatives to each of the respective first and second support; a rotatable cutting head mounted at each of the first and second arms, each head rotatable about a head axis orientated to extend substantially transverse to each respective arm pivot axis.

Reference within this specification to each head being rotatable about a head axis orientated to extend substantially transverse to each respective arm pivot axis includes (or encompasses) a perpendicular alignment. Such a reference also encompasses the respective pivot axes intersecting or more preferably not intersecting with the rotational axes of the cutting heads. Optionally, the rotational axes of the cutting heads are positioned generally in front of and/or above the respective pivot axes of the pivot arms.

Optionally, each cutting head comprises a generally annular cutting edge or layered cutting edges to provide an undercutting mode of operation. The configuration of each head to provide the undercutting action is advantageous to break the rock with less force and in turn provide a more efficient cutting operation that draws less power.

Preferably, the apparatus comprises a plurality of roller cutters independently rotatably mounted at each rotatable cutting head. Preferably, the roller cutters are generally annular roller cutters each having a generally annular cutting edge or layered cutting edges to provide an undercutting mode of operation. More preferably, the roller cutters are mounted at a perimeter region of each cutting head such that the roller cutters circumferentially surround each cutting head. Such a configuration is advantageous to provide the undercutting action of the apparatus with the roller cutters first creating a channel or groove extending generally horizontally in the rock face. The roller cutters may then be moved upwardly to break the rock by overcoming the tensile forces immediately above the channel or groove. A more efficient cutting operation is provided requiring less force and drawing less power. Preferably, the roller cutters are mounted at generally cylindrical bodies and comprise generally annular cutting edges distributed around the perimeter of the cutting head. Each generally circular cutting edge is accordingly positioned side-by-side around the circumference of the cutting head with each cutting edge representing an endmost part of each pivoting arm. Preferably an alignment of the rotational axes of the roller cutters relative to the rotational axis of the respective cutting head is the same so that the respective cutting edges are all orientated in the same position around the cutting head.

Preferably, each of the first and second arm actuator comprises a planetary gear assembly mounted at the junction at which each arm pivots relative to each support. The subject invention may comprise a conventional planetary gear arrangement such as a Wolfram type planetary gear having a high gear ratio. The planetary gear assembly is mounted internally with each arm such that the cutting apparatus is designed to be as compact as possible. Preferably, the apparatus further comprises at least one first drive motor to drive the pivoting movement of the first and/or second arm relative to the respective first and second support and the main frame. Preferably, the apparatus comprises two drive motors to drive each of the first and second arms about their pivoting axis via the respective planetary gears. Preferably, the respective drive motors are mounted in-board of each arm and are coupled to each arm via the planetary gear assembly and/or an intermediate drive transmission.

Preferably, the apparatus further comprises at least one second drive motor to drive rotation of the cutting head at the first and/or the second arm. Preferably, each head comprises two drive motors mounted at the side of each arm. Such an arrangement is advantageous to pivot each drive motor with each cutting head and to provide a direct drive with minimal intermediate gearing.

Optionally, the first and second support actuator comprises a hydraulic linear actuator. Preferably, each support actuator comprises a linear hydraulic cylinder positioned at the lateral sides of the sled and coupled to extend between the sled and an actuating flange extending laterally outward from each support. Such an arrangement is advantageous to minimise the overall width of the apparatus whilst providing an efficient mechanism for the sideways lateral slewing of each support and accordingly each arm.

Optionally, the sled may be positioned to operate longitudinally between the supports and each of the respective arms. That is, each arm may be configured to slide in the axially forward direction relative to each support via one or a plurality of actuators. Optionally, each arm is connected to each support via a respective sliding actuator such that each arm is configured to slide independently relative to one another. Optionally, each arm may be configured to slide in a forward and rearward direction relative to each support via a coordinated parallel sliding mechanism.

Preferably, the apparatus further comprises a powered sled movably mounted at the main frame to be configured to slide in a forward cutting direction of the apparatus relative to the main frame. The apparatus may further comprise a plurality of 'runners' or guide rails to minimise the frictional sliding movement of the sled over the main frame. Preferably, the apparatus comprises at least one powered linear actuator to provide the forward and rearward movement of the sled relative to the main frame. As will be appreciated, the sled may be configured to move axially/longitudinally at the machine via a plurality of different actuating mechanisms including rack and pinion arrangements, belt drive arrangements, gear arrangements and the like. Preferably the supports and the arms are mounted at the sled and are all configured to move in the forward and rearward direction collectively.

Optionally, each of the first and second arms is configured to pivot in the upward and downward direction by up to 180°. Optionally, each arm may be configured to pivot over a range of up to 155°. Optionally, the first and second supports are configured to pivot in the lateral sideways direction by up to 90°. Optionally, the supports may be configured to pivot up to 20° in the lateral sideways direction. Such a configuration provides control of the profile shape and avoids any cuts or ridge that would otherwise remain on the roof and floor of the as-formed tunnel.

Preferably, the apparatus comprises tracks or wheels mounted at the main frame to allow the apparatus to move in a forward and rearward direction. The tracks or wheels enable the apparatus to be advanced forwardly and rearwardly within the tunnel both when manoeuvred into and from the cutting face between cutting operations and to be advanced forwardly during cutting operations as part of the cut-and-advance cutting cycle that also utilises the sliding sled.

Preferably, the apparatus further comprises floor and roof engaging members mounted at the main frame, at least the floor engaging members being extendable and retractable to respectively raise and lower the apparatus in the upward and downward direction. The engaging members are configured to wedge the apparatus in position between the roof and floor of the tunnel to provide points of anchorage against which the machine may be braced to allow the cutters to be forced against the rock face.

Preferably, the apparatus further comprises a first material discharge conveyor to convey cut material rearwardly from the first and second cutting head; and a gathering head to direct cut material onto the conveyor, the gathering head positioned rearwardly behind at least one of the first and second cutting heads. The apparatus is accordingly configured to transport rearwardly material from the cut face to provide unhindered forward cutting movement into the rock.

Preferably, the apparatus further comprises a control unit demountably connectable to the apparatus, the control unit comprising operational components to power at least the first and second support and arm actuators, the control unit further comprising a second conveyor to receive material from the first conveyor and to discharge the material at a position rearward of the apparatus and the control unit. Preferably, the control unit is demountably coupled to the apparatus so as to be capable of being advanced and retracted in the forward and rearward directions with the cutting apparatus. Preferably, the control unit is suspended above the tunnel floor by suitable couplings to the apparatus. The control unit may comprise ground engaging support members provided at a rearward and/or forward regions. Optionally, the control unit may be attachable at its rearward end to a material collection and discharge vehicle and to be connectable at its forward end to the cutting apparatus.

According to a further aspect of the present invention there is provided cutting apparatus suitable for creating tunnels or subterranean roadways and the like comprising: a main frame having generally upward, downward and side facing regions; a powered sled movably mounted at the main frame to be configured to slide in a forward cutting direction of the apparatus relative to the main frame; a first and second arm pivotally coupled or mounted to the sled by respective pivot arm axes aligned in a direction extending transverse including perpendicular to a longitudinal axis of the main frame to allow each arm to pivot independently of one another in an upward and downward direction relative to the upward and downward facing region of the main frame; at least one first and second arm actuator to actuate independent pivoting movement of the first and second arms relative to one another and the main frame; a rotatable cutting head mounted at each of the first and second arms so as to be configured to be moved in the upward and downward direction and advanced in the forward cutting direction, each head rotatable about a head axis orientated to extend substantially transverse to respective pivot arm axes.

Optionally, the first and second arm together with the respective pivot arm axes are respectively coupled or mounted to the sled via a first and second support, the first and second supports are slidably mounted relative to the sled via a common or respective slidable means such that each first and second support is configured to slide laterally in a sideways direction relative to the side facing regions. The first and second supports are mounted at the sled and configured to slide laterally cross the sled substantially perpendicular to the forward and backward sliding movement of the sled relative to the main frame.

Optionally, each rotatable cutting head comprises a generally annular roller cutter each having a generally annular cutting edge or layered cutting edges to provide an undercutting mode of operation.

Preferably, the apparatus further comprises a plurality of roller cutters independently rotatably mounted at each rotatable cutting head. Optionally, the plurality of roller cutters is generally annular roller cutters each having a generally annular cutting edge or layered cutting edges to provide an undercutting mode of operation.

According to a further aspect of the present invention there is provided cutting apparatus configured to create a cutting profile via an undercutting operation to create tunnels and subterranean roadways, the apparatus comprising: a main frame; a first and second arm pivotally mounted to the main frame by respective pivot arm axes aligned in a direction extending transverse including perpendicular to a longitudinal axis of the main frame to allow each arm to pivot independently of one another in an upward and downward direction relative to an upward and downward facing region of the main frame; at least one first and second arm actuator to actuate independent pivoting movement of the first and second arms relative to one another and the main frame; a rotatable cutting head mounted at each of the first and second arms, each cutting head comprising generally annular roller cutters each having a generally annular cutting edge to provide an undercutting mode of operation.

Preferably, the apparatus comprises a first and second support pivotally mounted relative to the main frame via respective first and second support axes aligned generally upright relative to the upward and downward facing regions such that each first and second support is configured to pivot laterally in a sideways direction relative to the side facing regions.

Preferably, the apparatus further comprises a powered sled movably mounted at the main frame, the first and second arms mounted at the sled so as to be capable of longitudinal reciprocating movement to slide in a forward cutting direction of the apparatus to engage the roller cutters into the rock face.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
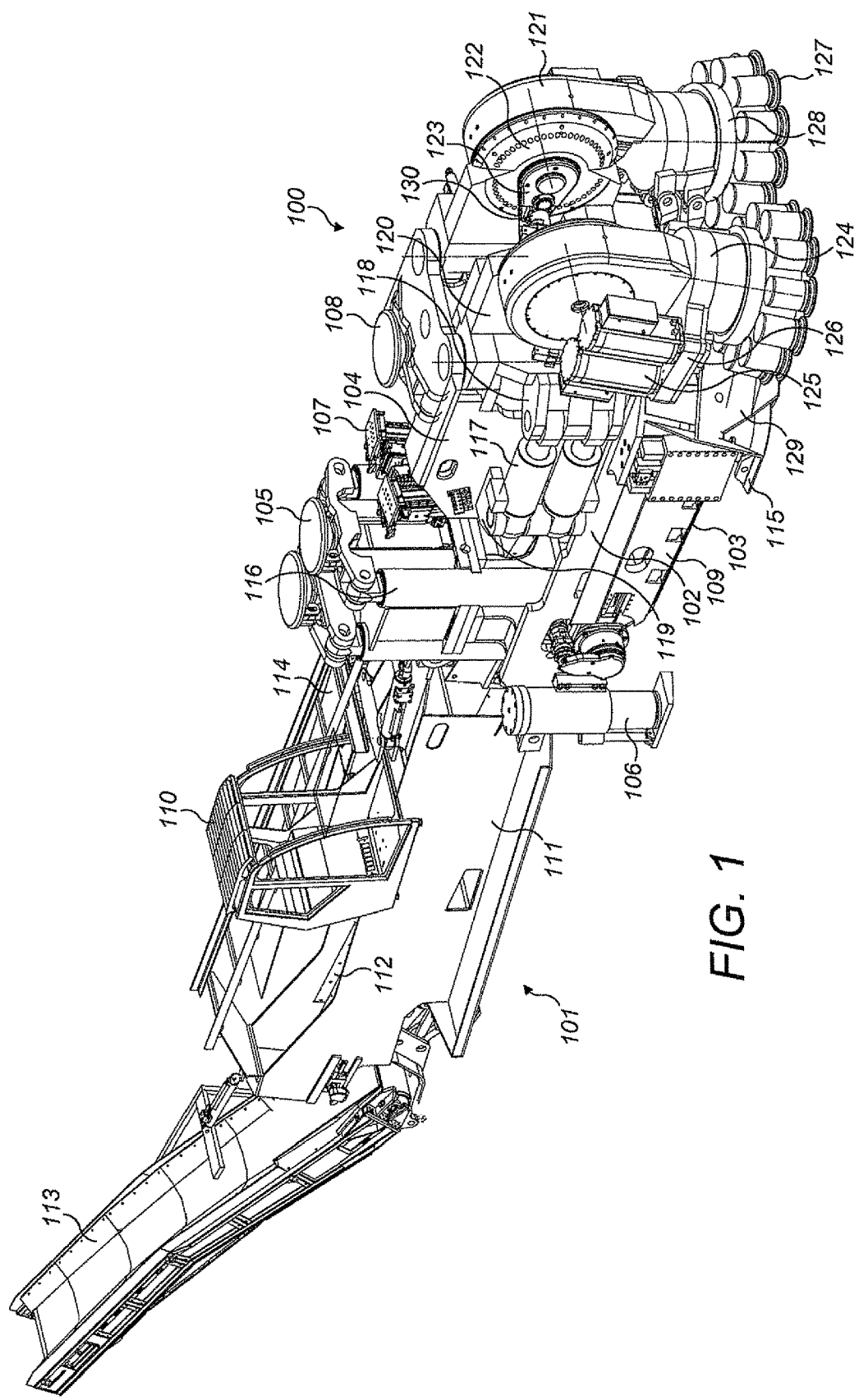
FIG. 1 is a front perspective view of a mobile cutting apparatus suitable for creating tunnels or subterranean roadways having a forward mounted cutting unit and a rearward control unit according to a specific implementation of the present invention.

Referring to FIG. 1, cutting apparatus 100 comprises a main frame 102 mounting a plurality of cutting components configured to cut into a rock or mineral face to create tunnels or subterranean roadways. Apparatus 100 is configured specifically for operation in an undercutting mode in which a plurality of rotatable roller cutters 127 may be forced into the rock to create a groove or channel and then to be pivoted vertically upward so as to overcome the reduced tensile force immediately above the groove or channel and break the rock. Accordingly, the present cutting apparatus is optimised for forward advancement into the rock or mineral utilising less force and energy typically required for conventional compression type cutters that utilise cutting bits or picks mounted at rotatable heads. However, the present apparatus may be configured with different types of cutting head to those described herein including in particular pick or bit type cutting heads in which each pick is angularly orientated at the cutting head to provide a predetermined cutting attack angle.

Figure 2:
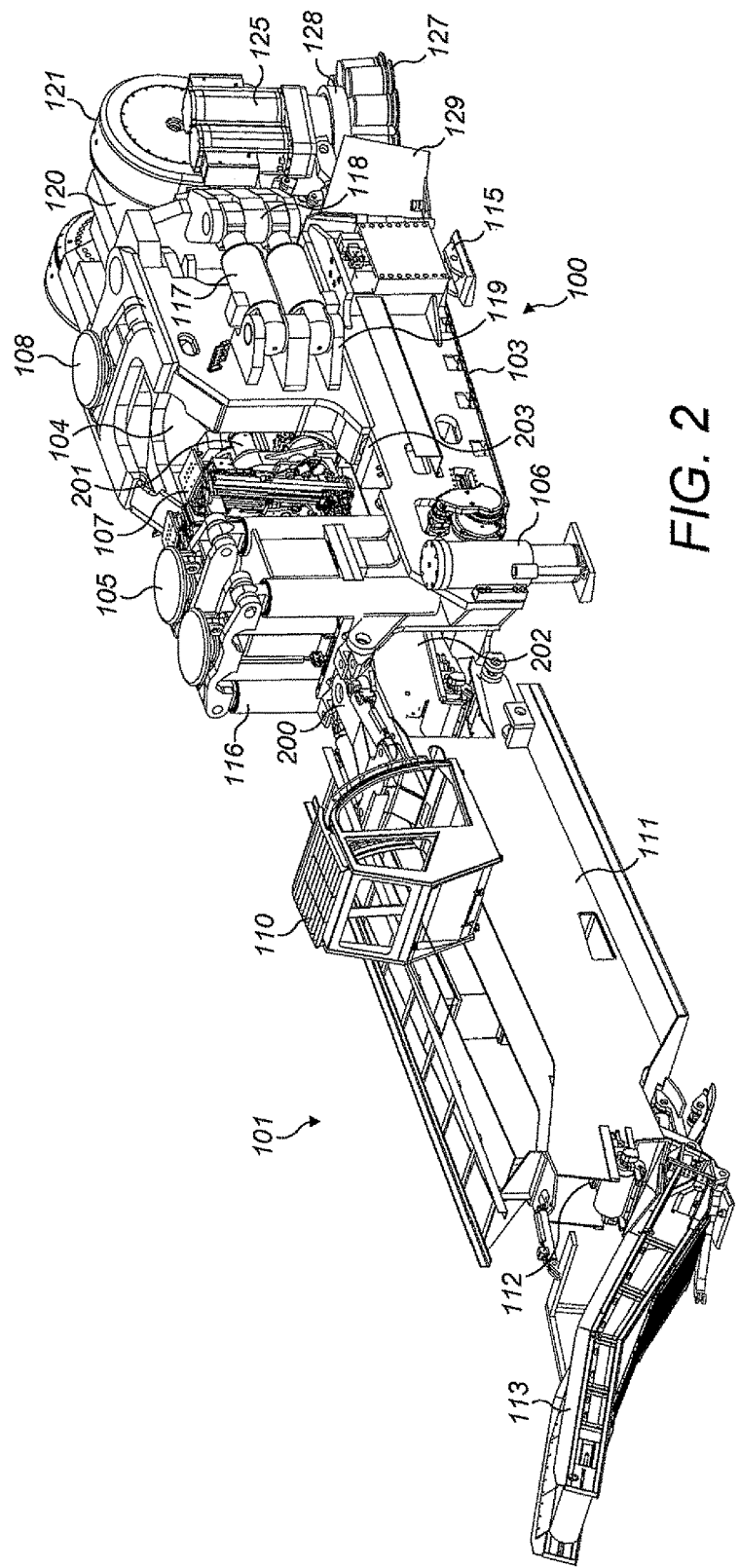
FIG. 2 is a rear perspective view of the cutting apparatus of FIG. 1.
Figure 3:
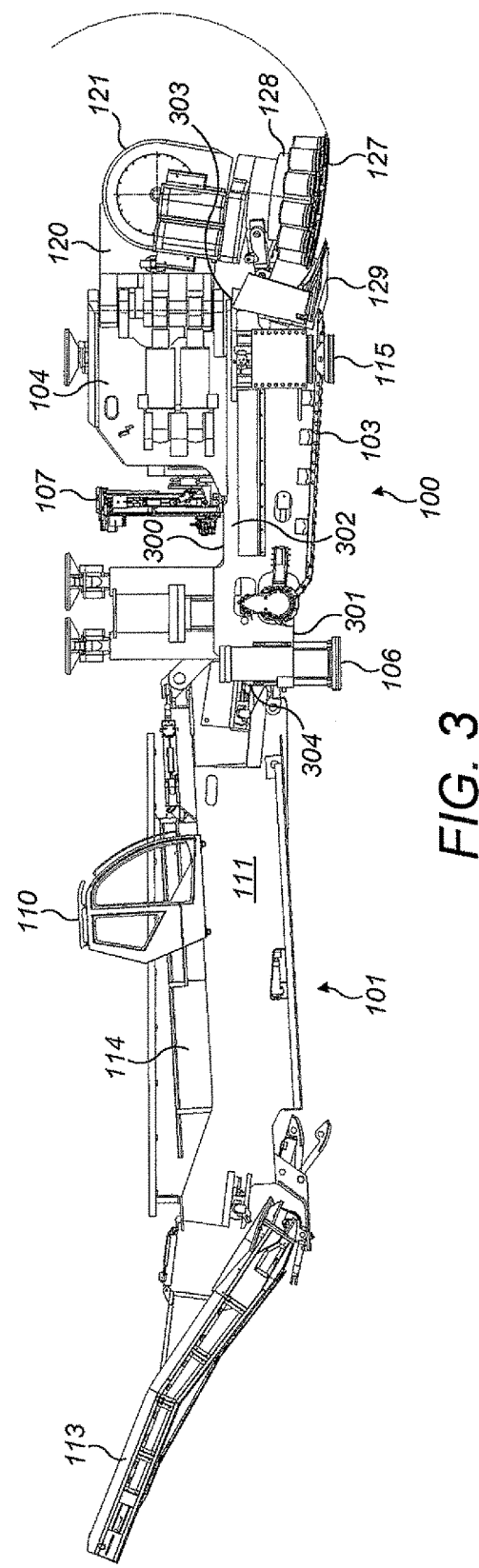
FIG. 3 is a side elevation view of the apparatus of FIG. 2.

Referring to FIGS. 1 to 3, main frame 102 comprises lateral sides 302 to be orientated towards the wall of the tunnel; an upward facing region 300 to be orientated towards a roof of the tunnel; a downward facing region 301 orientated to be facing the floor of the tunnel; a forward facing end 303 intended to be positioned facing the cutting face and a rearward facing end 304 intended to be positioned facing away from the cutting face.

An undercarriage 109 is mounted generally below main frame 102 and in turn mounts a pair of crawler tracks 103 driven by a hydraulic (or electric) motor to provide forward and rearward movement of apparatus 100 over the ground when in a non-cutting mode. A pair of rear ground engaging jacking legs 106 is mounted at frame sides 302 towards rearward end 304 and are configured to extend and retract linearly relative to frame 102. Frame 102 further comprises a forward pair of jacking legs 115 also mounted at each frame side 302 and towards forward end 303 and being configured to extend and retract to engage the floor tunnel. By actuation of legs 106, 115, main frame 102 and in particular tracks 103 may be raised and lowered in the upward and downward direction so as to suspend tracks 103 off the ground to position apparatus 100 in a cutting mode. A pair of roof engaging grippers 105 project upwardly from main frame 102 at frame rearward end 304 and are extendable and retractable linearly in the upward and downward direction via control cylinders 116. Grippers 105 are therefore configured to be raised into contact with the tunnel roof and in extendable combination with jacking legs 106, 115 are configured to wedge apparatus 100 in a stationary position between the tunnel floor and roof when in the cutting mode.

A sled 104 is slidably mounted on top of main frame 102 via a slide mechanism 203. Sled 104 is coupled to a linear hydraulic cylinder 201 such that by reciprocating extension and retraction of cylinder 201, sled 104 is configured slide linearly between frame forward and rearward ends 303, 304.

A pair of hydraulically actuated bolting units 107 is mounted at main frame 102 between sled 104 and roof gripping unit 105, 116 relative to a lengthwise direction of the apparatus. Bolting units 107 are configured to secure a mesh structure (not shown) to the roof of the tunnel as apparatus 100 is advanced in a forward cutting direction. Apparatus 100 also comprises a mesh support structure (not shown) mounted generally above sled 104 so as to positionally support the mesh directly below the roof prior to bolting into position.

Figure 4:
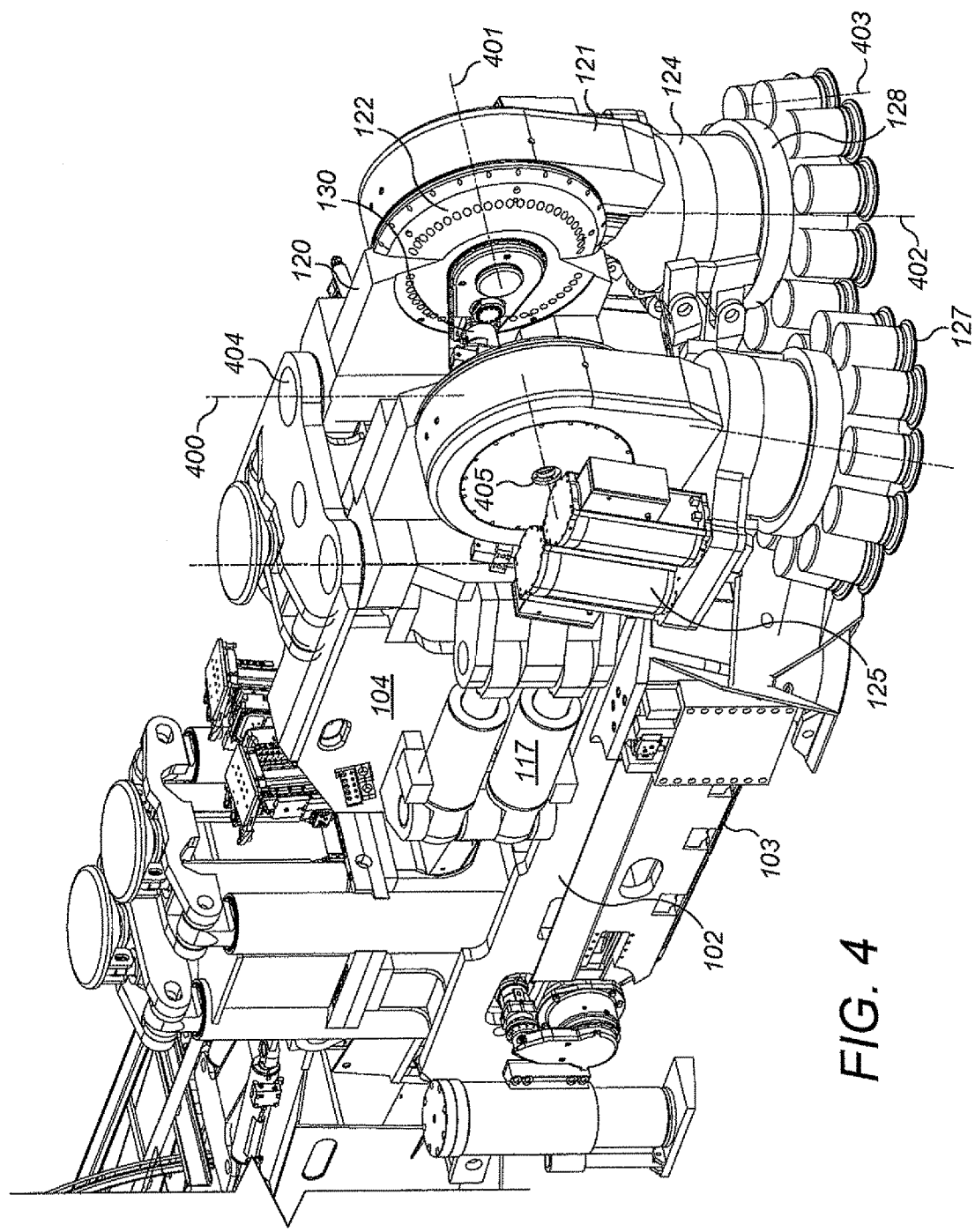
FIG. 4 is a magnified front perspective view of the cutting unit of the apparatus of FIG. 3.
Figure 5:
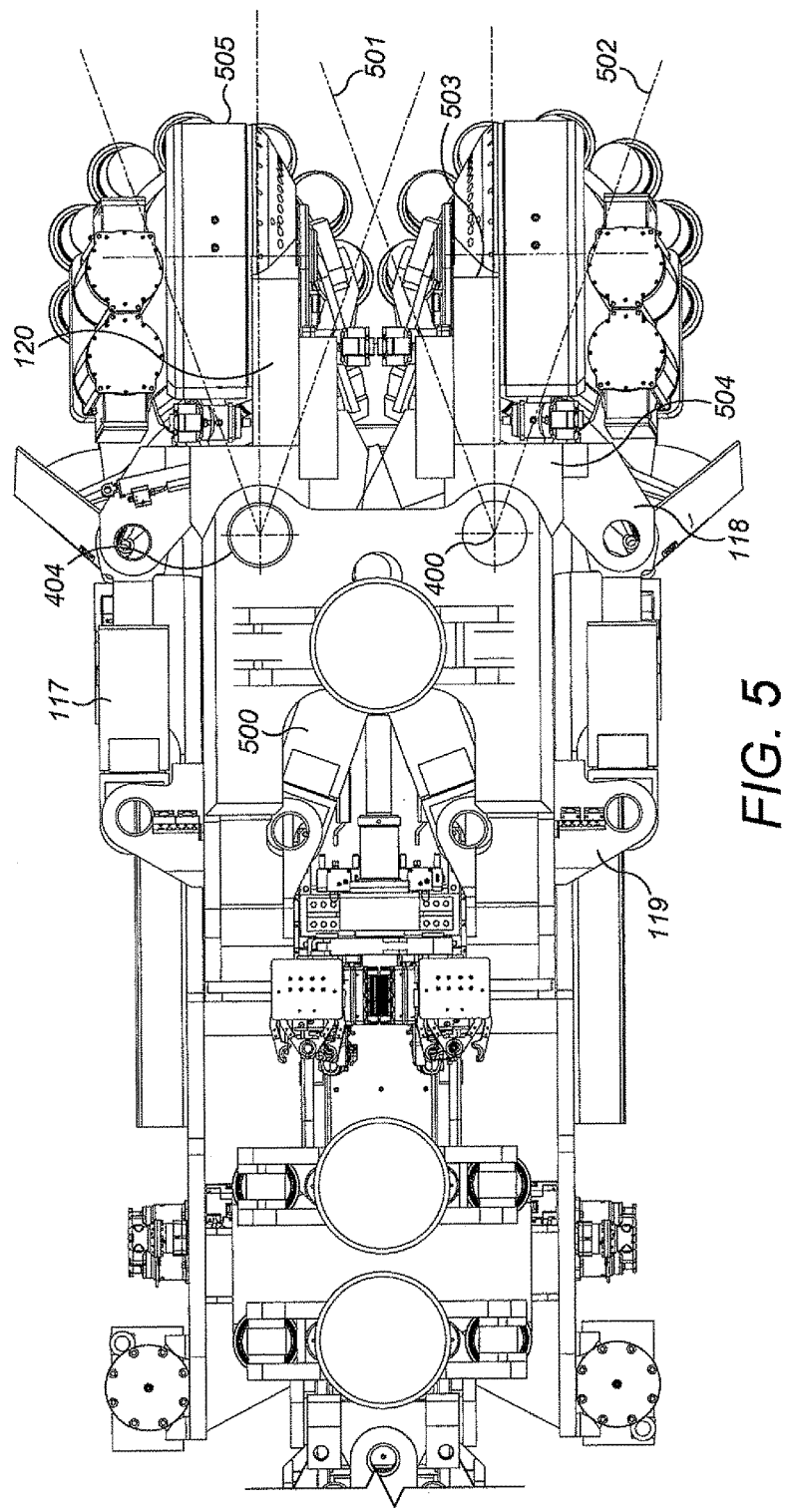
FIG. 5 is a plan view of the cutting apparatus of FIG. 4.

A pair of supports 120 are pivotally mounted at and project forwardly from sled 104 immediately above frame forward end 303. Supports 120 are generally spaced apart in a lateral widthwise direction of the apparatus 100 and are configured to independently pivot laterally outward from one another relative to sled 104 and main frame 102. Each support 120 comprises a forward end 503 and a rearward end 504 referring to FIG. 5. A first mount flange 118 is provided at support rearward end 504 being generally rearward facing. A corresponding second mount flange 119 projects laterally outward from a side of sled 104 immediately behind the first flange 118. A pair of linear hydraulic cylinders 117 is mounted to extend between flanges 118, 119 such that by linear extension and retraction, each support 120 is configured to pivot in the generally horizontal plane and in the lateral sideways direction relative to frame sides 302. Referring to FIG. 4, each support 120 is mounted at sled 104 via a pivot rod 404 extending generally vertically (when apparatus 100 is positioned on horizontal ground) through sled 104 and being suspended generally above the main frame forward end 303. Each support 120 is therefore configured to pivot or slew about pivot axis 400. Referring to FIG. 5, each support 120 is further coupled to a respective inner hydraulic cylinder 500 mounted at an inner region of sled 104 to cooperate with side mounted cylinders 117 to laterally slew each support 120 about pivot axis 400.

Referring to FIGS. 4 and 5, as the respective pivot axes 400 are space apart in the widthwise direction of apparatus 100, supports 120 are capable of being slewed inwardly to a maximum inward position 501 and to be slewed laterally outward to a maximum outward position 502. According to the specific implementation, an angle between the inner and outer slewing positions 501, 502 is 20°.

Figure 7:
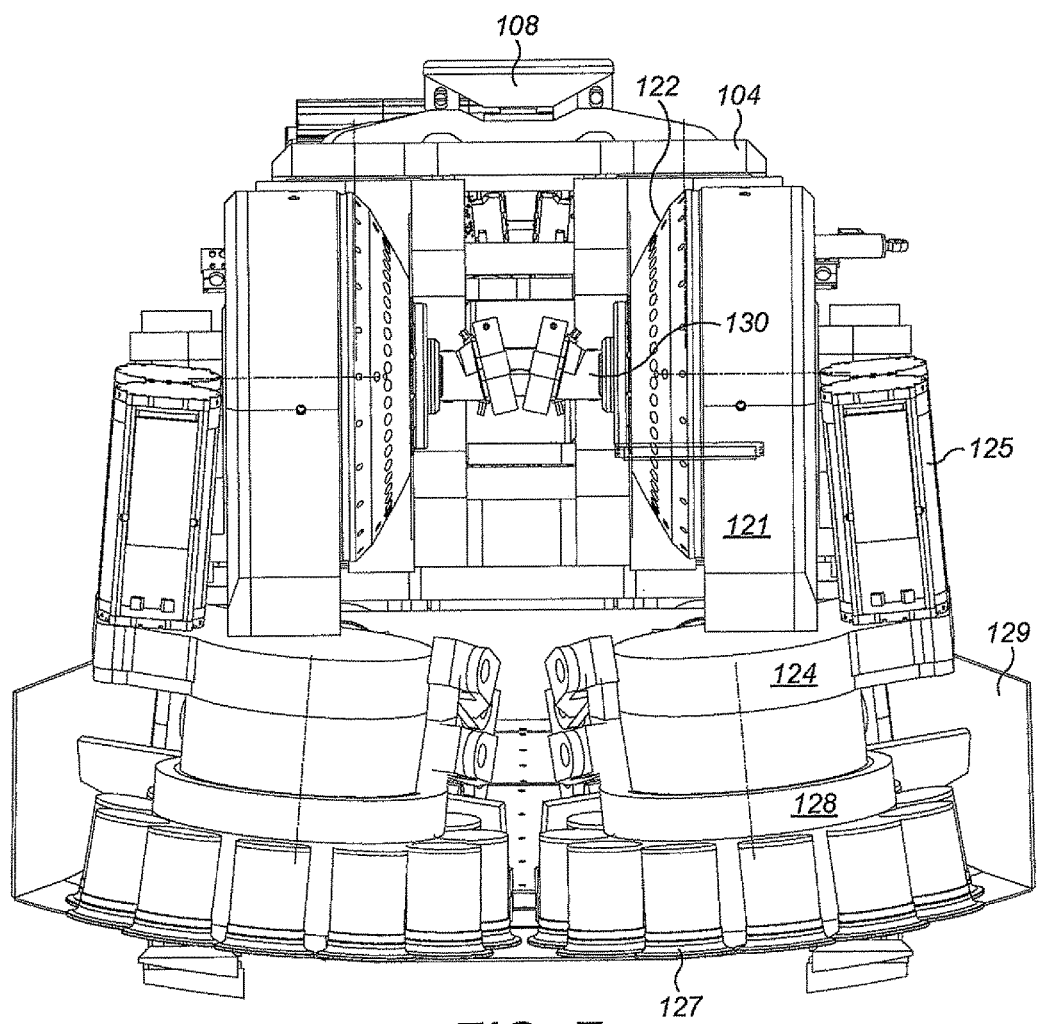
FIG. 7 is a front end view of the cutting apparatus of FIG. 6.

Referring to FIGS. 1 to 3, an arm 121 is pivotally mounted generally at the forward end 503 of each support 120. Each arm 121 comprises a cutting head 128 rotatably mounted at a distal end. Each cutting head 128 comprises a disk like (generally cylindrical) configuration. The plurality of generally annular or disc shaped roller cutters 127 are mounted at the circumferential perimeter of each head 128 and comprise a sharp annular cutting edge configured specifically for undercutting the rock. Cutters 127 are rotatably mounted independently relative to one another and head 128 and are generally free to rotate about their own axis. Each roller cutter 127 projects axially beyond a forwardmost annular edge of head 128 such that when arms 121 are orientated to be extending generally downward, roller cutters 127 represent a lowermost part of the entire head 128 and arm 121 assembly. Each arm 121 may be considered to comprise a length such that arm 121 is mounted at each respective support 120 at or towards a proximal arm end and to mount each head 128 at a distal arm end. In particular, each arm 121 comprises an internally mounted planetary gear indicated generally be reference 122. Each gear 122 is preferably a Wolfrom type and is coupled to a drive motor 130 via a drive train indicated generally by reference 123. A pair of drive motors 125 are mounted at the lateral sides of each arm 121 and are orientated to be approximately parallel with the rotational axis of each respective cutting head 128 as shown in FIG. 7. Each arm 121 further comprise an internal drive and gear assembly 124 coupled to a gear box 126 mounted at one end of each of the drive motors 125. Each cutting head 128 is driveably coupled to the drive motors 125 via the respective gear assembly 124 to provide rotation of cutting head 128 about axis 402.

Figure 6:
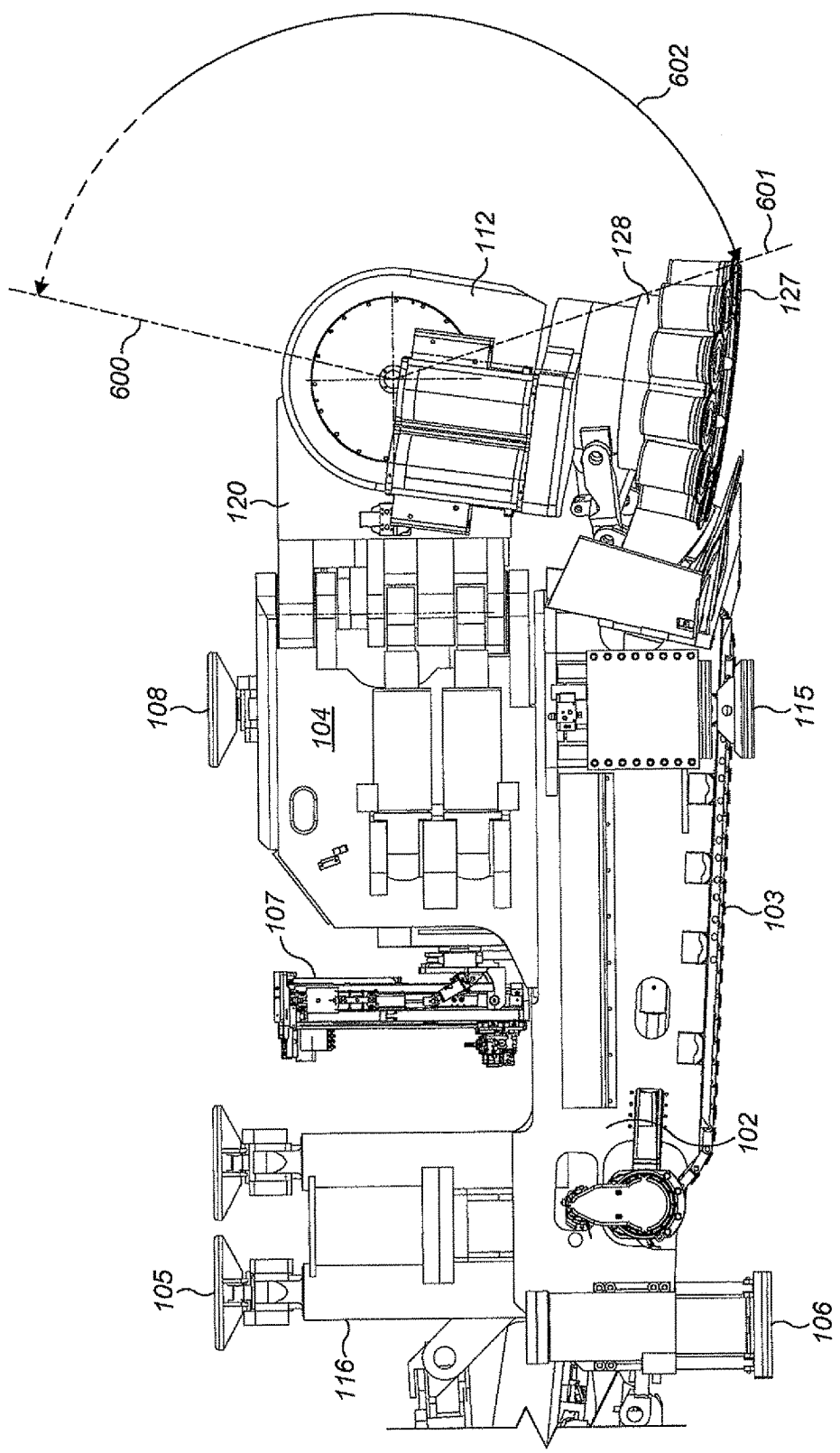
FIG. 6 is a side elevation view of the cutting apparatus of FIG. 5.

According to the specific implementation, and as shown in FIG. 7, each arm 121 is coupled to a respective motor 130 mounted at a forward end of sled 104. Each planetary gear 122 is centred on a pivot rod 405 having a pivot axis 401 referring to FIG. 4. Each axis 401 is aligned to be generally horizontal when apparatus 100 is positioned on horizontal ground. Accordingly, each arm 121 is configured to pivot (relative to each support 120, sled 104 and main frame 102) in the upward and downward direction (vertical plane) by actuation of each motor 130. As such, each cutting head 128 and in particular the roller cutters 127 may be raised and lowered along the arcuate path 602 referring to FIG. 6. In particular, each arm 121, head 128 and roller cutters 127 may be pivoted between a lowermost position 601 and an uppermost raised position 600 with an angle between positions 600, 601 being approximately 150°. When in the lowermost position 601, each roller cutter 127 and in particular head 128 is suspended in a declined orientation such that a forwardmost roller cutter 127 is positioned lower than a rearwardmost roller cutter 127. According to the specific implementation, this angle of declination is 10°. This is advantageous to engage the cutters 127 into the rock face at the desired attack angle to create the initial groove or channel during a first stage of the undercutting operation. Additionally, the extensive range of movement of the cutting heads 128 over the rock face is possible due, in part, to axis 401 being separated and positioned forward relative to axis 400 by a distance corresponding to a length of each support 120.

Referring to FIG. 4, each support pivot axis 400 is aligned generally perpendicular to each arm pivot axis 401. Additionally, a rotational axis 402 of each cutting head 128 is orientated generally perpendicular to each arm pivot axis 401. A corresponding rotational axis 403 of each roller cutter 127 is angularly disposed relative to cutting head axis 402 so as to taper outwardly in the downward direction. In particular, each roller cutter axis 403 is orientated to be aligned closer to the orientation of each cutting head rotational axis 402 and support pivot axis 400 relative to the generally perpendicular arm rotational axis 401.

Accordingly, each support 120 is configured to slew laterally outward in a horizontal plane about each support axis 400 between the extreme inner and positions 501, 502. Additionally and referring to FIG. 6, each respective arm 121 is configured to pivot in the upward and downward direction about arm pivot axis 401 to raise and lower the roller cutters 127 between the extreme positions 600, 601.

A gathering head 129 is mounted at main frame forward end 303 immediately rearward behind each cutting head 128. Gathering head 129 comprises a conventional shape and configuration having side loading aprons and a generally inclined upward facing material contact face to receive and guide cut material rearwardly from the cutting face (and cutting heads 128). Apparatus 100 further comprises a first conveyor 202 extending lengthwise from gathering head 129 to project rearwardly from frame rearward end 304. Accordingly, material cut from the face is gathered by head 129 and transported rearwardly along apparatus 100.

Referring to FIGS. 1 to 3, a detachable control unit 101 is mounted to the frame rearward end 403 via a pivot coupling 200. Control unit 111 comprises a personnel cabin 110 (to be occupied by an operator). Unit 111 further comprises an electric and hydraulic power pack 114 to control the various hydraulic and electrical components of apparatus 100 associated with the pivoting movement of supports 120 and arms 121 in addition to the sliding movement of sled 104 and the rotational drive of cutting heads 128.

Control unit 101 further comprises a second conveyor 112 extending generally lengthwise along the unit 101 and coupled at its forwardmost end to the rearwardmost end of first conveyor 202. Unit 101 further comprises a discharge conveyor 113 projecting rearwardly from the rearward end of second conveyor 112 at an upward declined angle. Accordingly, cut material is capable of being transported rearwardly from cutting heads 128 along conveyors 202, 112 and 113 to be received by a truck or other transportation vehicle.

In use, apparatus 100 is wedged between the tunnel floor and roof via jacking legs 106, 115 and roof grippers 105. Sled 104 may then be displaced in a forward direction relative to main frame 102 to engage roller cutters 127 onto the rock face. Cutting heads 128 are rotated via motors 125 that create the initial groove or channel in the rock face at a lowermost position. A first arm 121 is then pivoted about axis 401 via motor 130 to raise roller cutters 127 along path 602 to achieve the second stage undercutting operation. The first support 120 may then be slewed in the lateral sideways direction via pivoting about axis 400 and combined with the raising and lowering rotation of roller cutters 127 creates a depression or pocket within the rock immediately forward of the first arm 121 and support 120. The second arm 121 and associated head 128 and cutters 127 are then actuated according to the operation of the first arm 121 involving pivoting in both the vertical and horizontal planes. This sequential dual pivoting movement of the second arm 121 is independent of the initial dual pivoting movement of the first arm 121. A phasing and sequencing of the pivoting of arms 121 about axes 401 and supports 120 about axes 400 is controlled via control unit 111.

When the maximum forward travel of sled 104 is achieved, jacking legs 106, 115 are retracted to engage tracks 103 onto the ground. Tracks 103 are orientated to be generally declined (at an angle of approximately 10° relative to the floor) such that when ground contact is made, the roller cutters 127 are raised vertically so as to clear the tunnel floor. The apparatus 100 may then be advanced forward via tracks 103. Jacking legs 106, 115 may then be actuated again to raise tracks 103 off the grounds and grippers 105 moved into contact with the tunnel roof to repeat the cutting cycle. A forwardmost roof gripper 108 is mounted above sled 104 to stabilise the apparatus 100 when sled 104 is advanced in the forward direction via linear actuating cylinder 201.

Figure 8:
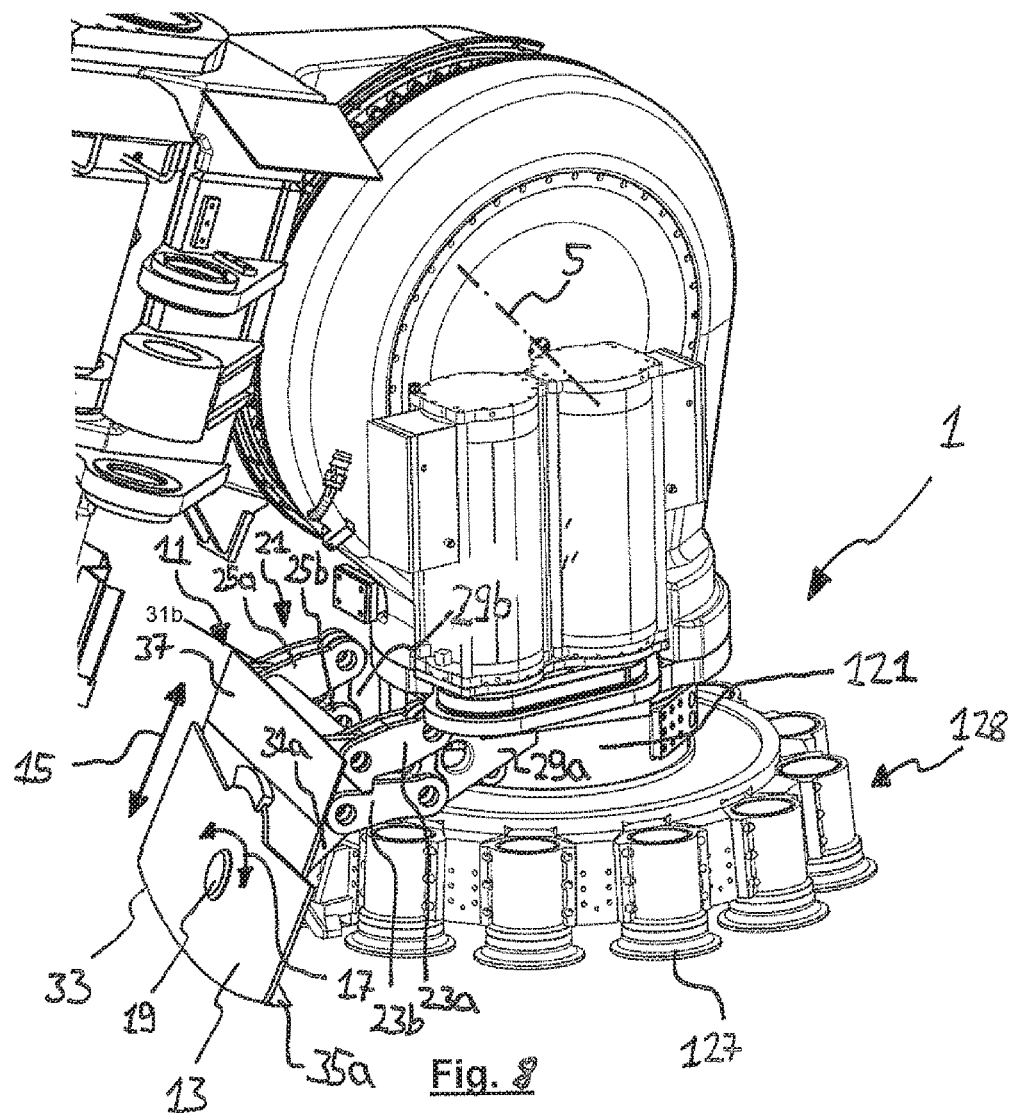
FIG. 8 is a perspective view of a cutting unit for use with a cutting apparatus suitable for creating tunnels or subterranean roadways according to a specific implementation of the present invention.

Referring to FIG. 8, the cutting unit 1 for use with a cutting apparatus suitable for creating tunnels or subterranean roadways and the like comprises a cutting arm 121 and a cutting head 128. The cutting arm 121 is configured for pivotal movement around the pivot axis 5. The cutting head 128 is mounted to the cutting arm 121 and comprises a plurality of rotatable cutting elements 127. The rotatable cutting elements 127 are configured for detaching material from a rock face.

The cutting unit 1 further comprises a clearing arrangement 11, wherein the clearing arrangement 11 is mounted to the cutting arm 121. The clearing arrangement 11 comprises a clearing blade 13 for pushing detached rock material onto a loading table of the cutting apparatus. The clearing blade 13 is guided by a first guiding mechanism allowing for a free movement of the clearing blade 13 in a first direction 15.

The first guiding mechanism comprises two slide shoes allowing for a free linear movement of the clearing blade 13. The slide shoes connect the clearing blade 13 with a guiding plate 37 and allow for relative movement between the clearing blade 13 and the guiding plate 37.

The clearing blade 13 is further guided by a second guiding mechanism allowing for a free rotational movement of the clearing blade 13 in a second direction 17. The second guiding mechanism comprises a pivot bearing 19. The clearing blade 13 can be locked in a desired rotational orientation by means of a locking mechanism. By using the locking mechanism a free rotational movement of the clearing blade in the rotational direction 17 is prevented.

The clearing arrangement 11 further comprises a blade actuating mechanism 21 connecting the clearing blade 13 and the cutting arm 121. The blade actuating mechanism 21 is configured for moving the clearing blade 13 between a retracted parking position and an operating position. FIG. 8 shows the clearing blade 13 in the operating position.

The blade actuating mechanism comprises a first pair of levers 23a, 23b and a second pair of levers 25a, 25b. Each pair of levers 23a, 23b, 25a, 25b comprises a first lever 23a, 25a and a second lever 23b, 25b. The levers 23a, 23b, 25a, 25b connect mounting plates 29a, 29b that are attached to the cutting arm 121 to supporting structures 31a, 31b of the clearing blade 13.

The clearing blade 13 comprises a curved front edge 33, wherein the front edge 33 is directed to the rock face when in use.

Figure 9A:
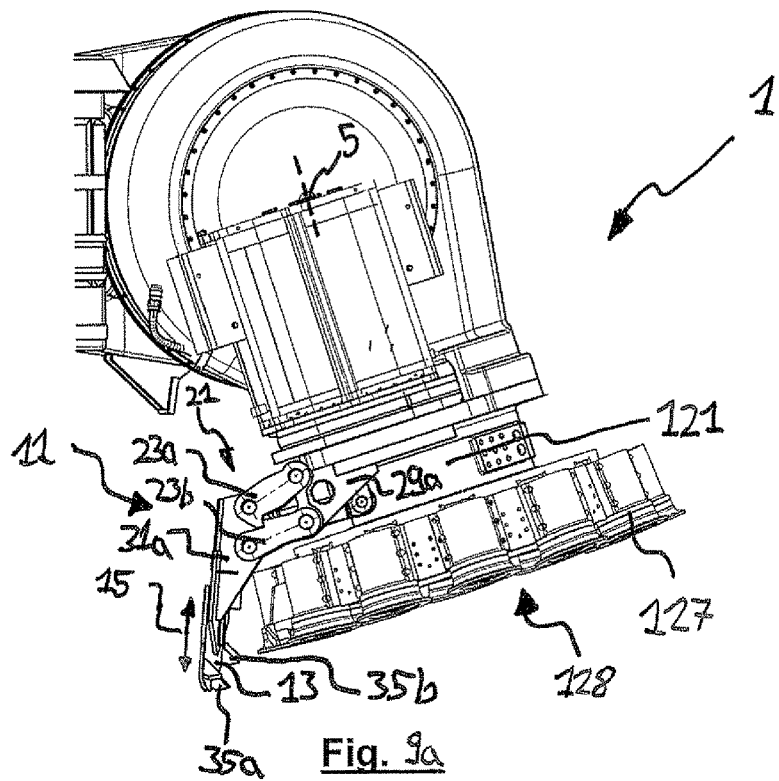
FIG. 9*a* is a side elevation view of the cutting unit of FIG. 8, wherein the clearing blade is in the operating position.

Referring to FIG. 9a, the clearing blade 13 of the clearing arrangement 11 is in the operating position. In the operating position of the clearing blade 13, the front edge 33 of the clearing blade 13 is in close proximity to the rock face and follows the profile of the tunnel while the cutting arm and the cutting head are pivotally moved around the pivot axis 5. By following the profile of the tunnel the clearing blade detaches loose material from the rock face by scraping along the rock face. In case the clearing blade 13 gets in contact with an obstacle, such as protruding rock material, the first guiding mechanism allows the clearing blade 13 to move in a rearward direction 15, in order to prevent damaging the clearing arrangement.

It is preferred, that the clearing blade 13 is in the operating position when the cutting arm and the cutting head are rotatably moved around the pivot axis in downward direction. Since the front edge of the clearing blade 13 is in close proximity to the rock face, the majority of the detached rock material, which is accumulated on the floor of the tunnel, has been pushed onto the loading table of the cutting apparatus when the cutting arm and the cutting head have completed their pivotal movement around the pivot axis 5 in downward direction.

Figure 9B:
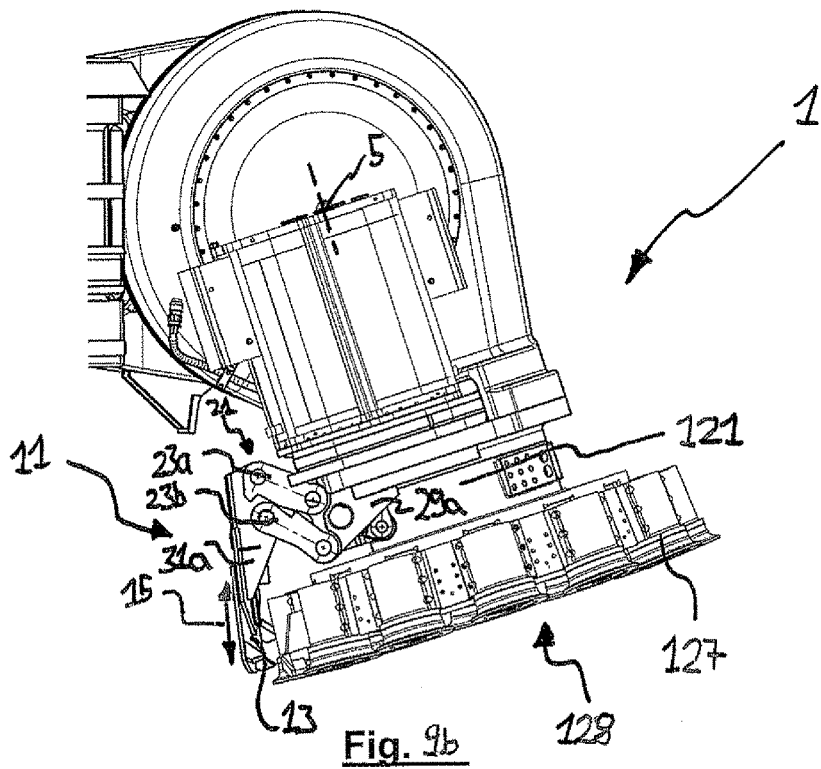
FIG. 9*b* is a side elevation view of the cutting unit of FIG. 8, wherein the clearing blade is in the parking position.

Referring to FIG. 9b, the clearing blade 13 is in the retracted parking position. The cutting unit 1 comprises a blade actuator mechanism 21 that is configured such that a movement of the clearing blade 13 between the parking position and the operating position comprises a linear and a rotational movement of the clearing blade 13. However, the movement between the parking position and the operating position is dominated by the linear movement. The clearing blade is, in addition to the linear movement, rotated by an angle of approximately 5 to 20 degrees. The blade actuator mechanism 21 allows therefore for a space-saving movement between the parking position and the operating position.

It is preferred that the clearing blade 13 is in parking position while the cutting is in progress. The cutting takes place while the cutting arm and the cutting head are pivotally moved around the pivot axis in upward direction. Since the clearing blade 13 is in the retracted parking position during the cutting process the detached rock material can fall onto the floor of the tunnel.

Figure 10A:
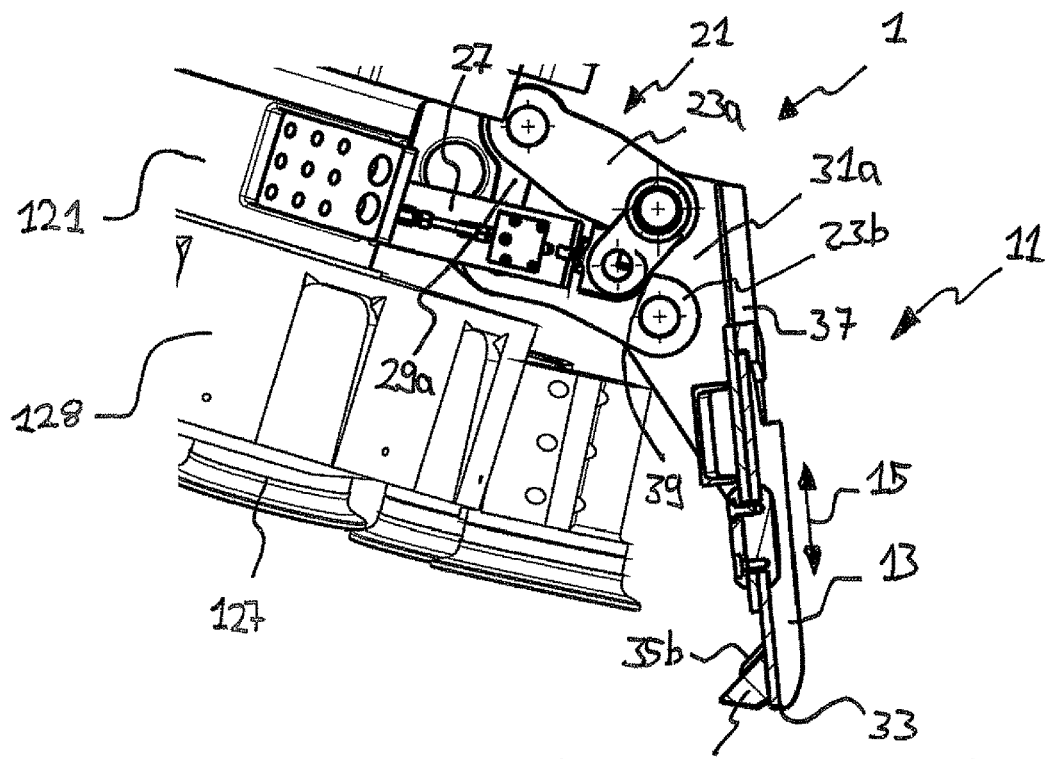
FIG. 10*a* is a magnified cross-sectional view of the cutting unit of FIG. 8, wherein the clearing blade is in the operating position.
Figure 10B:
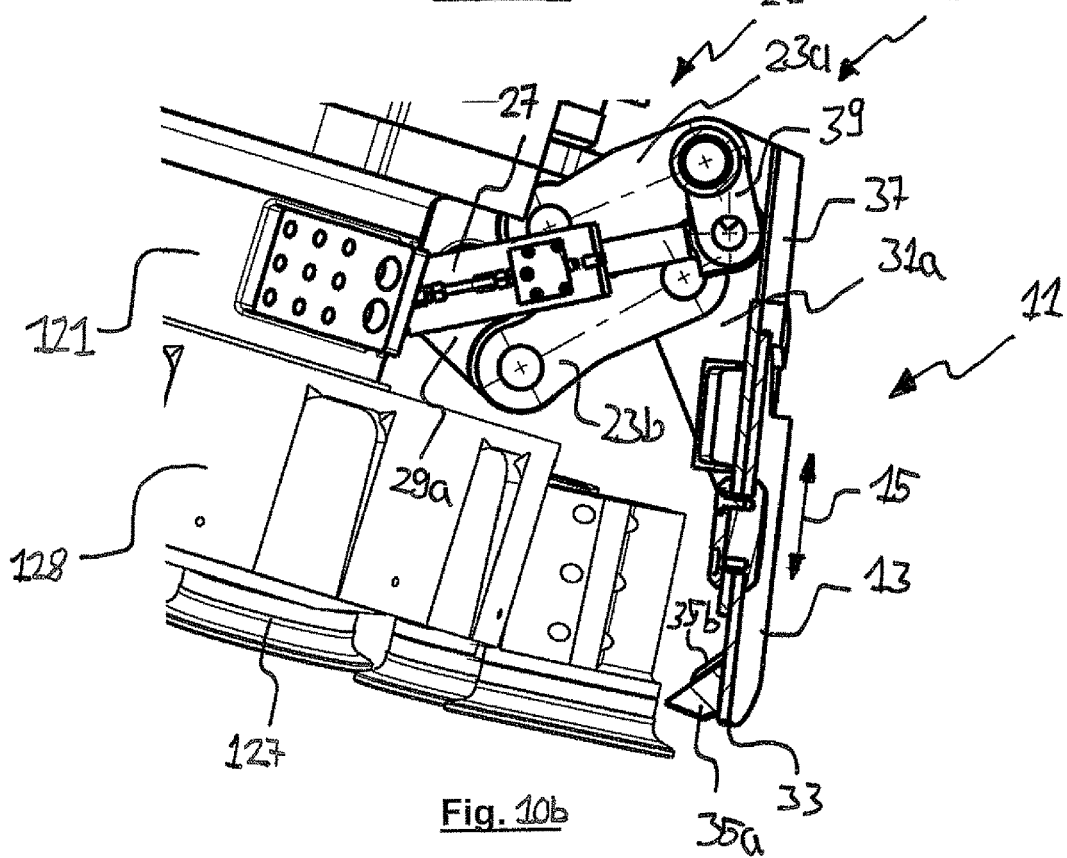
FIG. 10*b* is a magnified cross-sectional view of the cutting unit of FIG. 8, wherein the clearing blade is in the parking position.

Referring to FIGS. 10a and 10b the blade actuator mechanism 21 comprises two pair of levers 23a, 23b, 25a, 25b. Each pair of levers 23a, 23b, 25a, 25b comprises a first lever 23a, 25a and a second lever 23b, 25b. The first ends of the first and second levers 23a, 23b, 25a, 25b are rotatably mounted to mounting plates 29a, 29b. The mounting plates 29a, 29b are mounted to the cutting arm 121. The opposite second ends of the first and second levers 23a, 23b, 25a, 25b are rotatably mounted to supporting structures 31a, 31b of the clearing blade 13.

The first lever 23a, 25a of each pair of levers 23a, 23b, 25a, 25b as a first length and the second lever 23b, 25b has a second length different from the first length. By using first and second levers with different lengths the movement of the clearing blade 13 between the parking position and the operating position comprises a linear movement and rotational movement of the clearing blade 13.

The first and second levers 23a, 23b, 25a, 25b each comprise a stop surface, wherein the stop surface of the first and second levers 23a, 23b, 25a, 25b touch each other and limit the movement of the clearing blade 13, when the clearing blade 13 is in the operating position (see also FIGS. 8 and 9a).

The blade actuator mechanism 21 comprises a hydraulic cylinder 27. The hydraulic cylinder 27 is configured for moving the clearing blade 13 between the parking position and the operating position. The hydraulic cylinder 27 is rotatably mounted to the cutting arm 121 with its first end. The second opposite end of the hydraulic cylinder 27 is rotatably mounted to an intermediate lever 39. The intermediate lever 39 is rotatably mounted to a supporting structure 31a of the clearing blade 13.

Three claws 35a, 35b, 35c are mounted to the clearing blade 13. The claws 35a, 35b, 35c are flush-mounted to the front edge 33 of the clearing blade. However, the claws 35a, 35b, 35c may also mounted such that they extent beyond the front edge 33 of the clearing blade 13.

Figure 11A:
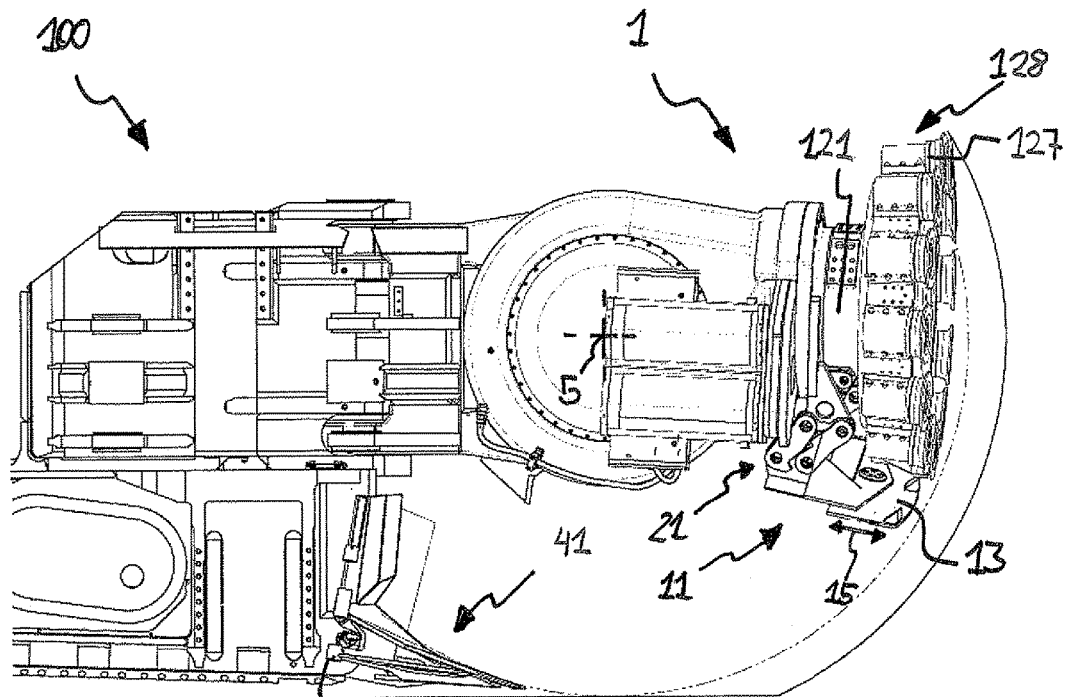
FIG. 11*a* is a side elevation view of an apparatus suitable for creating tunnels or subterranean roadways having the cutting unit of FIG. 8, wherein the clearing blade is in the parking position.
Figure 11B:
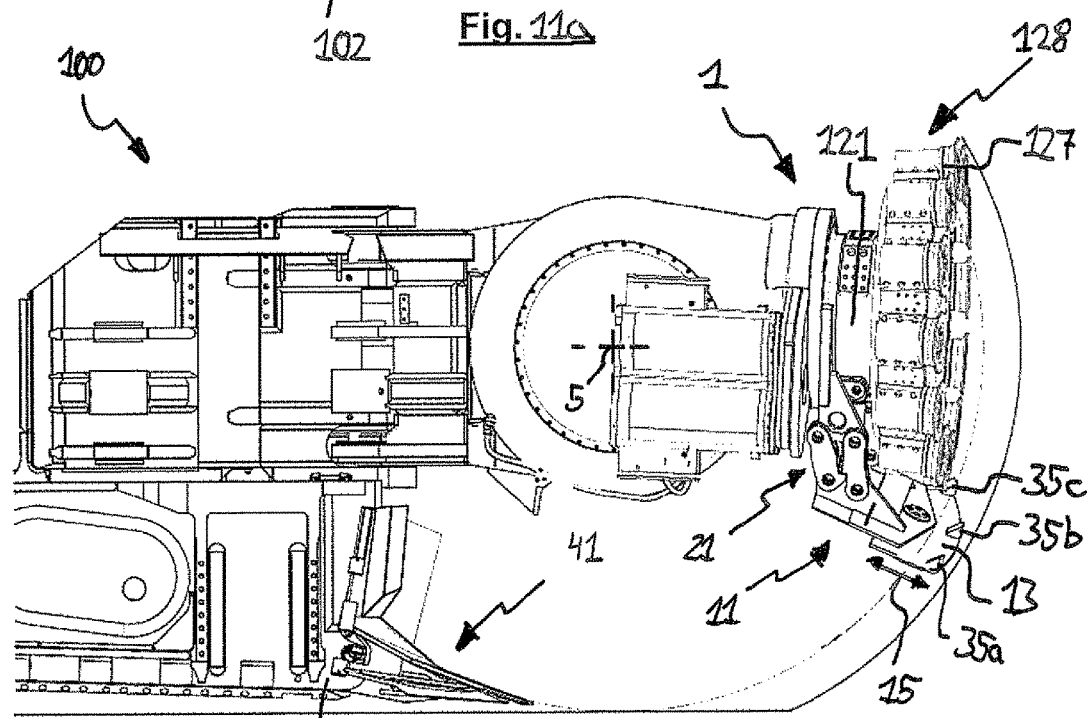
FIG. 11*b* is a side elevation view of the apparatus of FIG. 11*a*, wherein the clearing blade is in the operating position.

Referring to FIGS. 11a and 11b, the cutting apparatus 100 suitable for creating tunnels or subterranean roadways comprises a loading table 41 for receiving detached rock material and a cutting unit 1, wherein the cutting unit 1 is configured as described with respect to FIGS. 8 to 10b.

The clearing blade 13 of the cutting unit 1 is configured for pushing detached rock material onto the loading table 41. It is preferred that the clearing blade 13 is in the retracted parking position while cutting is in progress. The cutting takes place while the cutting arm 121 and the cutting head 128 are pivotally moved around the pivot axis 5 in upward direction (FIG. 11a). It is further preferred that the clearing blade 13 is in the operating position when the cutting arm and the cutting head are rotatably moved around the pivot axis 5 in downward direction (FIG. 11b). When the rotational movement of the cutting arm 121 and the cutting head 128 around pivot axis 5 in downward position is completed, the majority of the detached rock material accumulated on the floor of the tunnel has been pushed onto the loading table 41 of the apparatus 100.

The loading table 41 and the cutting unit 1 are mounted on a common frame sled 104, wherein the sled is configured for relative movement with respect to a main frame of the apparatus 100 to which a drive unit for movement of the apparatus 100 is mounted.

EXEMPLARY EMBODIMENTS

Embodiment 1

Cutting apparatus (100) suitable for creating tunnels or subterranean roadways and the like comprising:

a main frame (102) having generally upward (300), downward (301) and side (302) facing regions;

a first and second support (120) pivotally mounted relative to the main frame (102) via respective first and second support axes (400) aligned generally upright relative to the upward (300) and downward (301) facing regions such that each first and second support (120) is configured to pivot laterally in a sideways direction relative to the side (302) facing regions;

at least one first and second support actuator (117) to respectively actuate independently movement of each of the first and second supports (120) relative to the main frame (102);

a first and second arm (121) each pivotally mounted to the respective first and second (120) support via a respective arm pivot axis (401) aligned in a direction extending transverse including perpendicular to each support pivot axis (400) to enable the first and second arms (121) to pivot independently of one another and to pivot relative to each of the respective first and second supports (120) in an upward and downward direction relative to the upward (300) and downward (301) facing regions;

at least one first and second arm actuator (122, 130) to actuate independently pivoting movement of the first and second arms (121) relatives to each of the respective first and second support (120);

a rotatable cutting head (128) mounted at each of the first and second arms (121), each head (128) rotatable about a head axis (402) orientated to extend substantially transverse to each respective arm pivot axis (401).

Embodiment 2

The apparatus of embodiment 1 wherein each cutting head comprises a generally annular cutting edge or layered cutting edges to provide an undercutting mode of operation.

Embodiment 3

The apparatus of embodiment 1 or 2 further comprising a plurality of roller cutters (127) independently rotatably mounted at each rotatable cutting head (128).

Embodiment 4

The apparatus of embodiment claim 3 wherein the plurality of roller cutters (127) are generally annular roller cutters each having a generally annular cutting edge or layered cutting edges to provide an undercutting mode of operation.

Embodiment 5

The apparatus of any one of the preceding embodiments wherein each of the first and second arm actuator (122, 130) comprises a planetary gear assembly mounted at the junction at which each arm (121) pivots relative to each support (120).

Embodiment 6

The apparatus of any one of the preceding embodiments wherein at least one of the first and second arm actuator (122, 130) comprises at least one first drive motor to drive the pivoting movement of the first and/or second arm (121) relative to the respective first and second support (120).

Embodiment 7

The apparatus of any one of the preceding embodiments further comprising at least one second drive motor (125) to drive rotation of the cutting head (128) at the first and/or the second arm (121).

Embodiment 8

The apparatus of any one of the preceding embodiments wherein the first and second support actuator (117) comprises a hydraulic linear actuator.

Embodiment 9

The apparatus of any one of the preceding embodiments further comprising a powered sled (104) movably mounted at the main frame (102) to be configured to slide in a forward cutting direction of the apparatus (100) relative to the main frame (102).

Embodiment 10

The apparatus of embodiment 9 wherein each of the first and second cutting head (128) is mounted at the sled (104) via the respective first and second arms (121) and supports (120) so as to be configured to advance in the forward cutting direction.

Embodiment 11

The apparatus of any one of the preceding embodiments wherein:
each of the first and second arms (121) is configured to pivot in the upward and downward direction by up to 180°; and
each of the first and second supports (120) is configured to pivot in the lateral sideways direction by up to 90°.

Embodiment 12

The apparatus of any one of the preceding embodiments further comprising tracks (103) or wheels mounted at the main frame (102) to allow the apparatus (100) to move in a forward and rearward direction.

Embodiment 13

The apparatus of any one of the preceding embodiments further comprising floor and roof engaging members (106, 115, 105, 108) mounted at the main frame (102), at least the floor engaging members (106, 115) being extendable and retractable to respectively raise and lower the apparatus (100) in the upward and downward direction.

Embodiment 14

The apparatus of any one of the preceding embodiments further comprising:
a first material discharge conveyor (202) to convey cut material rearwardly from the first and second cutting head (128); and
a gathering head (129) to direct cut material onto the conveyor (202), the gathering head (129) positioned rearwardly behind at least one of the first and second cutting heads (128).

Embodiment 15

The apparatus of embodiment 14 further comprising a control unit (101) demountably connectable to the apparatus (100), the control unit (101) comprising operational components (114) to power at least the first and second support (120) and arm actuators (122, 130), the control unit (101) further comprising a second conveyor (112) to receive material from the first conveyor (202) and to discharge the material at a position rearward of the apparatus (100) and the control unit (101).

Embodiment 16

Cutting apparatus (100) suitable for creating tunnels or subterranean roadways and the like comprising:
a main frame (102) having generally upward (300), downward (301) and side (302) facing regions;
a powered sled (104) movably mounted at the main frame (102) to be configured to slide in a forward cutting direction of the apparatus (100) relative to the main frame (102);
a first and second arm (121) pivotally mounted to the sled (104) by respective pivot arm axes (401) aligned in a direction extending transverse including perpendicular to a longitudinal axis of the main frame (102) to allow each arm (121) to pivot independently of one another in an upward and downward direction relative to the upward and downward facing region of the main frame (102);

at least one first and second arm actuator (122, 130) to actuate independent pivoting movement of the first and second arms (121) relative to one another and the main frame (102);

a rotatable cutting head (128) mounted at each of the first and second arms (121) so as to be configured to be moved in the upward and downward direction and advanced in the forward cutting direction, each head (128) rotatable about a head axis (402) orientated to extend substantially transverse to respective pivot arm axes (401).

Embodiment 17

The apparatus of embodiment 16 wherein each first and second arm (121) together with the respective pivot arm axes is respectively mounted to the sled (104) via a first and second support (120) that is slidably mounted relative to the sled (104) via a common or respective slidable means such that each first and second support (120) is configured to slide laterally in a sideways direction relative to the side facing regions (302).

Embodiment 18

The apparatus of embodiment 16 or 17 wherein each rotatable cutting head (128) comprises a generally annular roller cutter (127) each having a generally annular cutting edge or layered cutting edges to provide an undercutting mode of operation.

Embodiment 19

The apparatus of any one of embodiments 16 to 18 further comprising a plurality of roller cutters (127) independently rotatably mounted at each rotatable cutting head (128).

Embodiment 20

The apparatus of embodiment 19 wherein the plurality of roller cutters (127) are generally annular roller cutters each having a generally annular cutting edge or layered cutting edges to provide an undercutting mode of operation.

Embodiment 21

The apparatus of any one of embodiments 17 to 20 wherein each of the first and second arm actuator (122, 130) comprises a planetary gear assembly mounted at the junction at which each arm (121) pivots relative to each support.

The features of the embodiments presented hereinabove are understood to be, alone or in combination with each other, preferred embodiments of the invention in themselves as well as in combination with what is claimed hereinafter.

The invention claimed is:

1. A cutting unit for use with a cutting apparatus suitable for creating tunnels or subterranean roadways and the like, the cutting unit comprising:
a cutting arm configured for pivotal movement around at least one pivot axis:
a cutting head mounted to the cutting arm, the cutting head including at least one rotatable cutting element for detaching material from a rock face; and
a clearing arrangement mounted to the cutting arm, wherein the clearing arrangement includes a clearing blade arranged to push detached rock material onto a loading table of the cutting apparatus, the clearing blade being guided by a first guiding mechanism allowing for free movement of the clearing blade in a first direction, the first guiding mechanism including one or more slide shoes allowing for free linear movement of the clearing blade in the first direction.

2. The cutting unit according to claim 1,
wherein the clearing blade is guided by a second guiding mechanism allowing for a free movement of the clearing blade in a second direction.

3. The cutting unit according to claim 2,
wherein the second guiding mechanism includes a pivot bearing allowing for a free rotational movement of the clearing blade in the second direction.

4. The cutting unit according to claim 1, wherein the clearing arrangement includes a blade actuator mechanism connecting the clearing blade and the cutting arm, the blade actuator mechanism being configured for moving the clearing blade between a parking position and an operating position.

5. The cutting unit according to claim 4,
wherein the blade actuator mechanism is configured such that a movement of the clearing blade between the parking position and the operating position includes a linear movement and a rotational movement of the clearing blade.

6. The cutting unit according to claim 4,
wherein the blade actuator mechanism includes at least one pair of levers, each pair of levers including a first lever and a second lever, wherein first ends of the first and second levers are rotatably mounted to a mounting plate mounted to the cutting arm and wherein opposite second ends of the first and second levers are rotatably mounted to a supporting structure of the clearing blade.

7. The cutting unit according to claim 6,
wherein the first lever has a first length and the second lever has a second length different from the first length.

8. The cutting unit according to claim 6, wherein the first and second levers each have a stop surface, wherein each stop surface of the first and second levers touch each other and limit the movement of the clearing blade, when the clearing blade is in the operating position.

9. The cutting unit according to claim 4, wherein the blade actuator mechanism includes a hydraulic cylinder configured for moving the clearing blade between the parking position and the operating position.

10. The cutting unit according to claim 1, wherein the clearing blade includes a curved front edge, the front edge being directed to the rock face when in use.

11. The cutting unit according to claim 10,
wherein the clearing blade includes at least one claw mounted thereon.

12. The cutting unit according to claim 11,
wherein a plurality of claws are flush-mounted to the front edge of the clearing blade or extend beyond the front edge of the clearing blade.

13. A cutting apparatus suitable for creating tunnels or subterranean roadways and the like, comprising:
a loading table arranged to receive detached rock material; and
a cutting unit including a cutting arm configured for pivotal movement around at least one pivot axis, a cutting head mounted to the cutting arm, the cutting head including at least one rotatable cutting element for detaching material from a rock face, and a clearing arrangement mounted to the cutting arm, wherein the clearing arrangement includes a clearing blade arranged to push detached rock material onto the loading table of the cutting apparatus, the clearing blade being guided by a first guiding mechanism allowing for free movement of the clearing blade in a first direction, the first guiding mechanism including one or more slide shoes allowing for free linear movement of the clearing blade in the first direction.

14. The cutting apparatus according to claim 13, wherein the loading table and the cutting unit are mounted on a sled, the sled being configured for relative movement with respect to a main frame of the apparatus to which a drive unit for movement of the apparatus is mounted.

* * * * *